United States Patent [19]

Christian et al.

[11] Patent Number: 5,324,074
[45] Date of Patent: Jun. 28, 1994

[54] AIRBAG SYSTEM

[76] Inventors: Ronald A. Christian, 356 N.W. 110th Ter., Coral Springs, Fla. 33071; Steven D. Smith, 6142 Sheps Island Rd., Sarasota, Fla. 34241

[21] Appl. No.: 788,738

[22] Filed: Nov. 7, 1991

[51] Int. Cl.$^5$ .............................. B60R 21/22
[52] U.S. Cl. .................. 280/728 R; 280/731; 280/732
[58] Field of Search ............... 280/728, 730, 732, 743, 280/735, 728 R, 730 R; 180/282; 307/10.1; 340/525, 815.12, 815.15; 116/28 R, 279; 200/61.50, 61.49, 314, 307

[56] References Cited

U.S. PATENT DOCUMENTS

| 2,649,311 | 8/1953 | Hetrick | 280/734 |
| 2,834,606 | 5/1958 | Bertrand | 280/730 |
| 3,495,675 | 2/1970 | Hass et al. | 280/735 |
| 3,566,350 | 2/1971 | Kahn | 200/61.49 |
| 3,632,133 | 1/1972 | Hass | 280/730 |
| 3,632,136 | 1/1972 | Foltz . | |
| 3,672,699 | 6/1972 | De Windt | 280/735 |
| 3,742,858 | 7/1973 | Stonestrom | 280/735 |
| 3,745,523 | 7/1973 | Lewis et al. | 280/735 |
| 3,853,331 | 12/1974 | Jones | 280/735 |
| 3,853,332 | 12/1974 | Lynch | 280/740 |
| 3,916,376 | 10/1975 | Tuttle | 280/735 |
| 4,006,954 | 2/1977 | Ikewa et al. | 280/735 |
| 4,552,380 | 11/1985 | Stevens | 280/728 |
| 4,565,535 | 1/1986 | Tassy | 280/743 |
| 4,748,306 | 5/1988 | Schlegel | 200/307 |
| 4,881,754 | 11/1989 | Lutze et al. | 280/728 |
| 4,927,172 | 5/1990 | Motozawa | 200/61.5 |
| 4,938,504 | 7/1990 | Fukuda et al. | 280/731 |
| 4,973,859 | 11/1990 | Shodai | 280/735 |

FOREIGN PATENT DOCUMENTS 2711192 9/1978 Fed. Rep. of Germany ...... 280/735

Primary Examiner—Karin L. Tyson
Attorney, Agent, or Firm—Oltman and Flynn

[57] ABSTRACT

An airbag system for a vehicle having a plurality of seats, each having a respective support structure fixedly disposed forward of each of the seats; a plurality of inflatable airbags; hook-and-pile or snap fasteners disposed between each airbag and a respective support structure; at least one impact sensor in the vehicle, and a plug-and-jack for connecting at least a selected one of the inflatable airbags with the impact sensor upon an impact to the vehicle.

9 Claims, 5 Drawing Sheets

AIRBAG SYSTEM

The invention relates to an airbag system for vehicles for protecting seat occupants against severe impact to the vehicle, and more particularly to an airbag system having an airbag selection feature and means for restoring the airbag system to service after an impact.

BACKGROUND OF THE PRIOR ART

Inflatable airbag systems installed in motor vehicles have long been known and used for protecting vehicle occupants in case of severe impact to the vehicle. Such an airbag system is known for example from U.S. Pat. No. 3,632,133, which shows an inflatable airbag system actuated by an impact sensor that electrically energizes an airbag upon a vehicle impact or collision.

Such airbag systems are relatively expensive, especially when arranged to protect vehicle occupants other than the driver, and restoring the airbag system to service after it has been activated by an impact is also a relatively expensive operation. The trend is now to install further airbags for vehicle occupants beyond the driver, which, it follows, increases the cost of restoring the airbag system to service once it has been activated.

It is therefore an object of the instant invention to provide an inflatable airbag system that with a relatively small expense is capable of being restored to service after an impact.

It is another object to provide an airbag system having selection arrangement for selectively arming only airbags for seats that are actually occupied.

SUMMARY OF THE INVENTION

The conventional inflatable airbag includes an airbag module, in the following simply called "airbag", which includes a bag of strong fabric tightly packed within a frangible cover that rips apart upon actuation of the airbag, and a gas generator cartridge disposed inside the packed airbag which can be actuated by an electric igniter to rapidly inflate the packed airbag when activated by an impact-sensing device.

In accordance with the invention there is provided an airbag system for a vehicle having a plurality of seats, each having a respective support structure fixedly disposed forward of each of the seats; a plurality of inflatable airbags; respective detachable attachment means disposed between each airbag and a respective support structure; at least one impact sensor in the vehicle, selective airbag connection means for selectively connecting at least a selected one of the inflatable airbags with the impact sensor upon an impact to the vehicle.

In accordance with a further feature there is provided an airbag system which includes a selector switch in the selective airbag connection means, the selector switch having an input terminal connected to the impact sensor, a plurality of manually operable contact pairs, each of the contact pairs having an input contact connected to the input terminal, and an output contact connected to a respective airbag.

In accordance with still another feature, the airbag system includes a visual indicator coupled to each manually operable pair of contacts for visually indicating the pair of contacts being in its set position, and wherein the detachable attachment means for the airbags include a plurality of hook-and-pile fasteners disposed between the airbags and the support structures.

The airbag system may alternatively include a plurality of snap fasteners disposed between the airbags and the support structure.

The impact sensor according to the invention includes a pair of settable contacts for closing an airbag activating circuit, the pair of settable contacts including a fixed contact and a movable contact having a set and a reset position, and an inertia mass in engagement with the movable contact for moving the movable contact into the set position in engagement with the fixed contact on impact.

The sensor resetting means include an over-center holding arrangement in engagement with the movable contact for holding the movable contact in one of the set and reset positions, and a reset pushbutton in engagement with the movable contact for manually pushing the movable contact into its reset position, and wherein each of the manually operable contact pairs may include a double-throw toggle coupled to each of the contact pairs, or alternatively each of the manually operable contact pairs may include a push-on-push-off button coupled to each of the contact pairs.

The airbag system may further include another contact pair mechanically coupled to each of the manually operable contact pairs and electrically connected to the visual indicator for energizing the indicator upon operation of the respective pair of manually operable contacts.

Further objects and advantages of this invention will be apparent from the following detailed description of a presently preferred embodiment which is illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 8A:
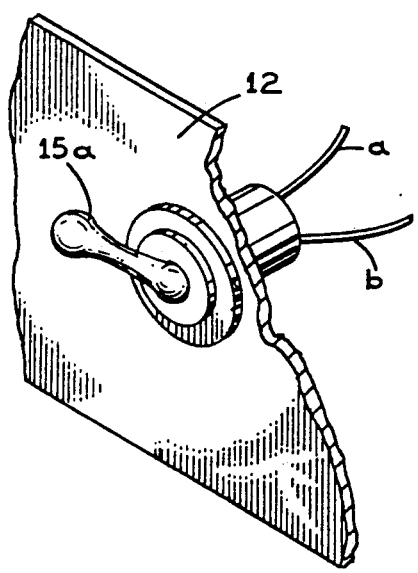
FIG. 8a is a perspective view of a toggle switch.
Figure 8B:
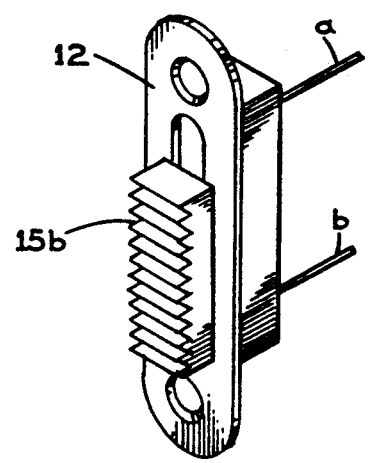

FIG. 8b is a perspective view of a slide switch.

DESCRIPTION OF THE PREFERRED EMBODIMENTS

Figure 1:
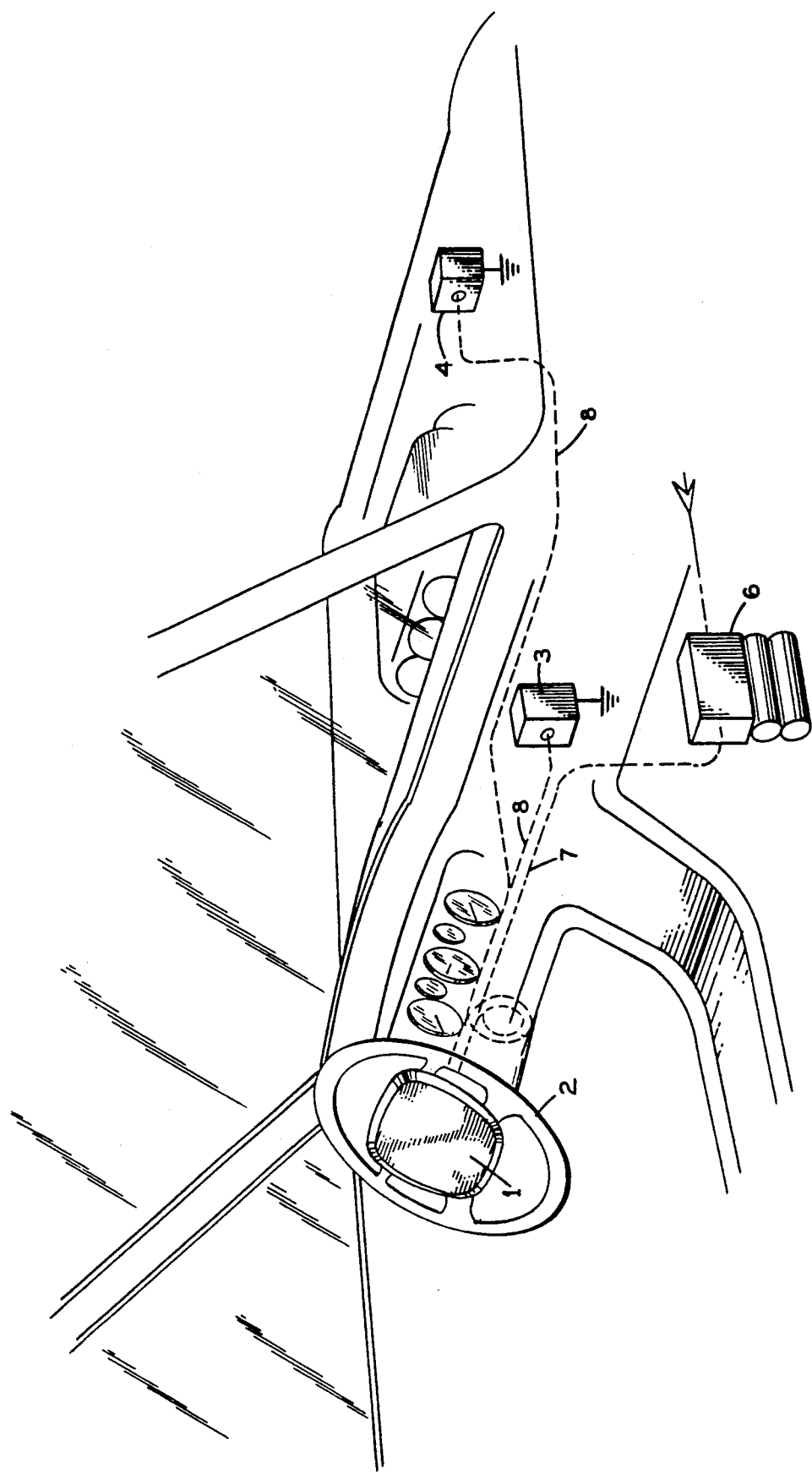
FIG. 1 is a diagrammatic view showing a conventional airbag system for the driver's seat only.

FIG. 1 is a diagrammatic perspective view of a conventional airbag system with an airbag module 1 (in the following called "airbag") mounted in its tightly packed condition on the top of the center part of the steering wheel 2. The airbag 1 has a built-in gas generator with an electric igniter that can be activated by at least two impact sensors including a passenger compartment impact sensor 3 and a forward compartment impact sensor 4 in the vehicle's engine compartment. A power module 6 connected to the vehicle's 12 volt power system includes mainly a large capacitor that provides the momentary surge of electric power to fire the igniter in the airbag 1. The power module 6 is connected via a conductor 7, shown as a stippled line, to one pole of the airbag 1. The impact sensors 3 and 4 are connected via conductors 8 shown as dashed lines to the other pole of the airbag 1.

Usually more than one impact sensor is provided in order to sense impact at various points of a vehicle upon impacts of various types such as front end impact, rear end impact, side impact and so on.

Figure 2:
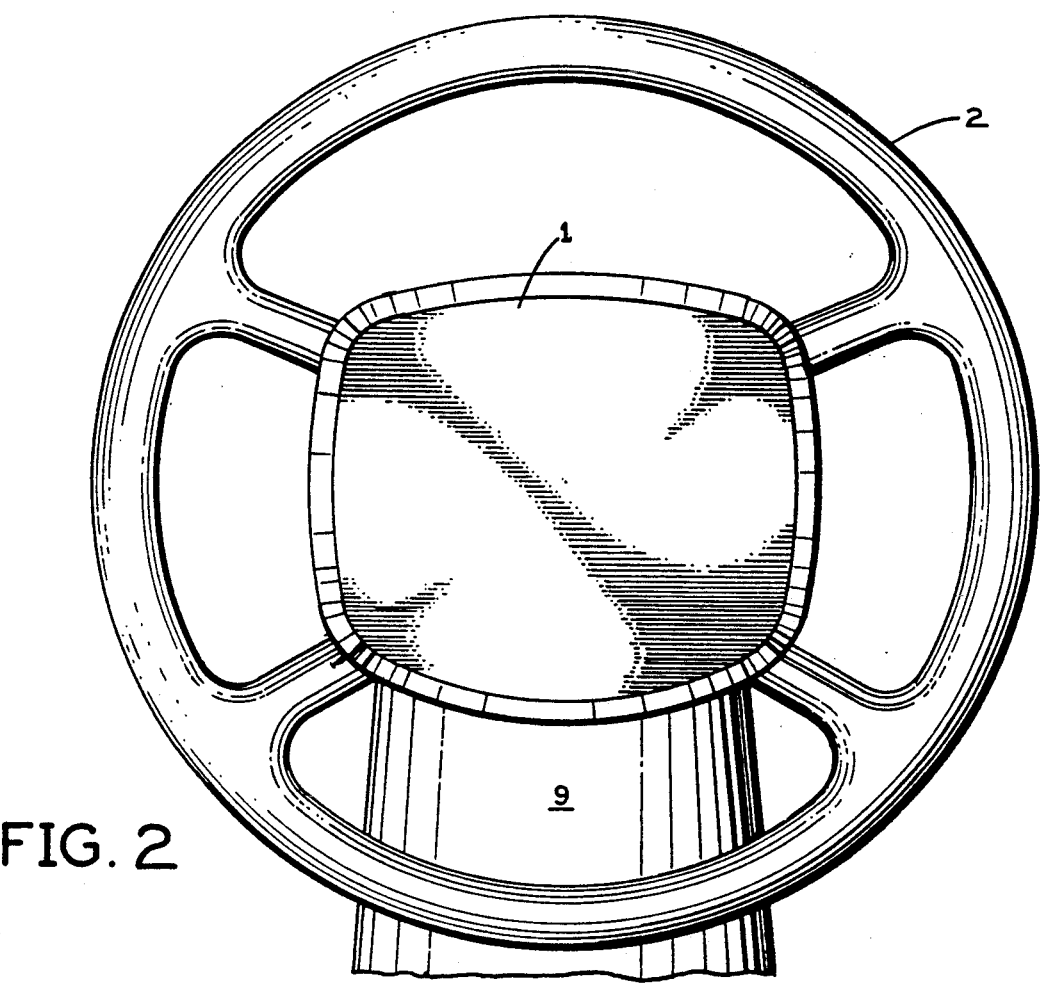
FIG. 2 is a plan view showing an airbag module mounted on the steering wheel.

FIG. 2 shows in more detail the airbag 1 installed centrally in the steering wheel 2, mounted on top of a steering column 9 which is a sturdy structure of sufficient strength to brace the airbag against the impact force of a human head and torso during a collision.

Figure 3:
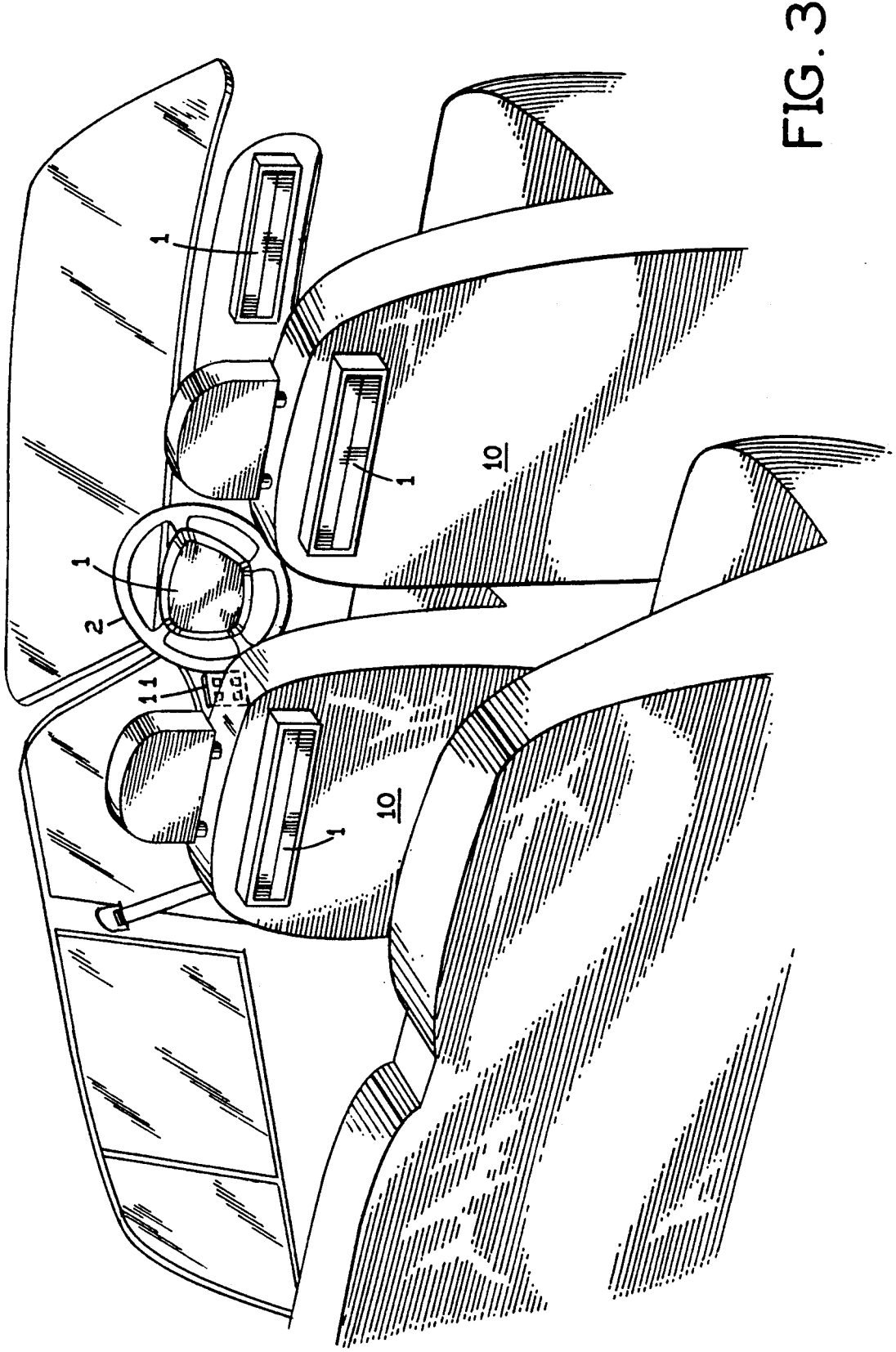
FIG. 3 is a diagrammatic perspective view of the invention showing airbag modules installed at four seats of a vehicle.

FIG. 3 shows the interior of a conventional four seat vehicle, wherein each seat is equipped with an airbag 1 in accordance with the invention. It is to be understood that the invention can be applied to any form of vehicle such as passenger vans, freight vans, trucks, aircraft, and motor boats, and that FIG. 3 is only an exemplary application of the invention as applied to a passenger motor vehicle.

FIG. 3 also shows a selector switch 11 positioned conveniently within the reach of the vehicle operator. With the selector switch 11, the driver can arm, i.e. make ready, any of the four airbags 1 according to the seats that are occupied. In case of an impact or a severe jolt to the vehicle, only those airbags that have been armed are actuated and inflated and and will need replacement.

The airbags are, as described in more detail below, detachably attached to a support structure in front of the passenger seat. The airbag 1 for the front passenger is mounted in the dashboard, and the airbags for the rear passengers are mounted in support structures in the rear side of the back rests 10 of the driver seat and the front passenger seat.

Figure 4:
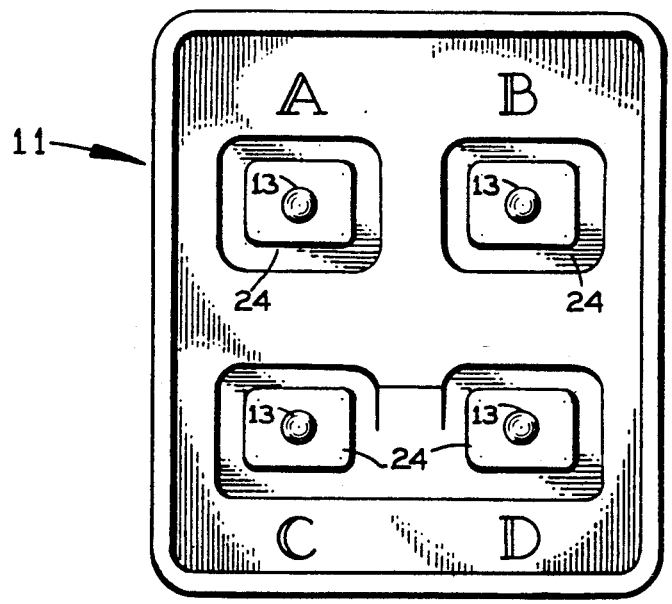
FIG. 4 is a plan view showing a selector switch with four push-on, push-off selection buttons, each equipped with a visual indicator.

FIG. 4 shows a typical selector switch 11 for four vehicle occupants. Each seat is represented by a respective manually operable pushbutton 24 of the push-on-push-off type for each seat, indicated as seats A, B, C and D. It follows that the driver's seat A may be permanently selected under the assumption that this seat will always be occupied when the vehicle is moving. Each pushbutton 24 can be equipped with a visual indicator 13, e.g. a light-emitting diode (LED) when it is activated, i.e. in the "on" condition.

Alternatively the switches can be toggle switches with a toggle 15a showing by its "up" or "down" position whether the switch is activated or not, as seen in FIG. 8, detail "a", or it can be a conventional slide switch as shown in FIG. 8, detail "b", with a slide 15b . The selector switch 11 has four manually operable switches 12 and has an input terminal 10, as shown in FIG. 5.

Figure 5:
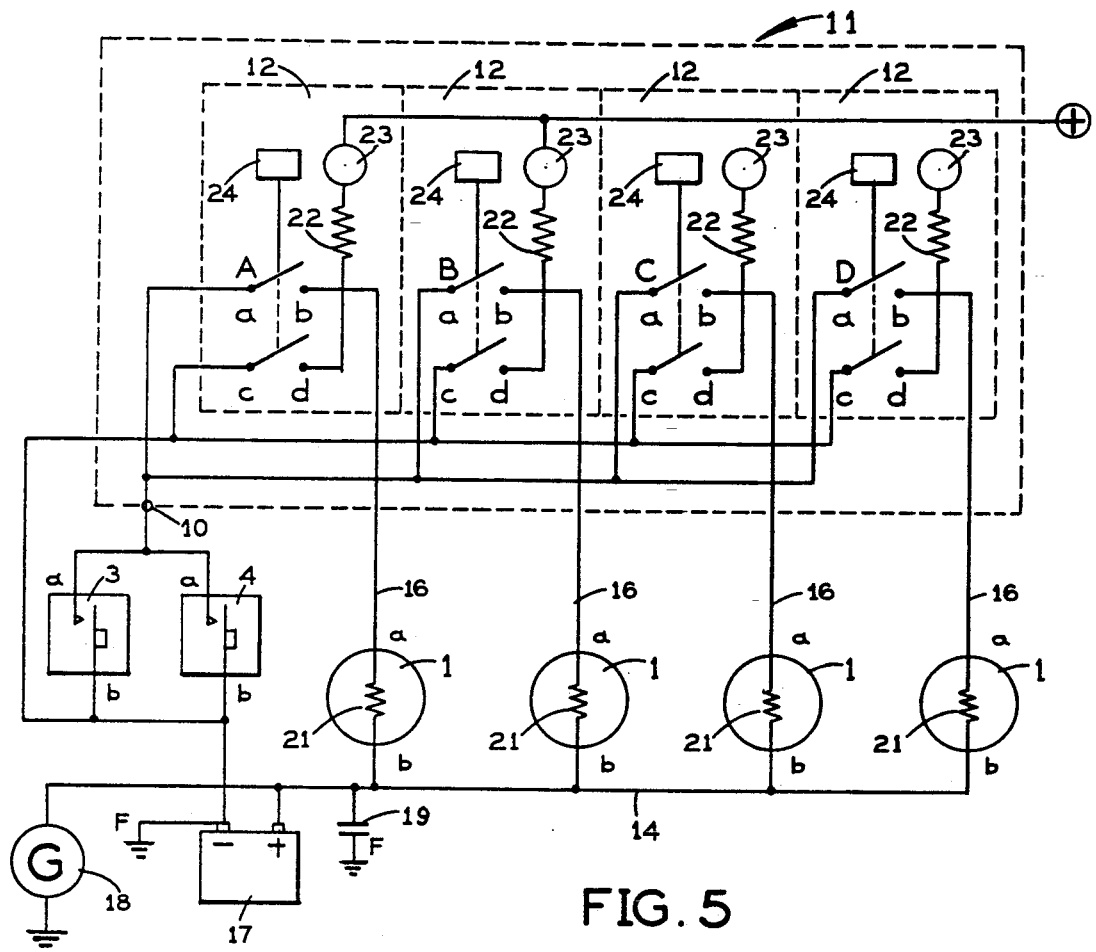
FIG. 5 is a wiring diagram of the invention.

FIG. 5 is a wiring diagram showing the electrical wiring of an airbag activating circuit which includes the selector switch 11 and the airbags 1. Each airbag has two terminals a and b, respectively connected to contacts b of switches 12 and commonly connected to the vehicle's +12 volt power bus 14. Each of the switches 12 has a first pair of manually operable contacts a,b of which contacts a are commonly connected to terminals a of the impact sensors 3,4 and contacts b are connected to respective terminals a of airbags 1. The impact sensors 3,4 have contacts b commonly connected to the vehicle's frame, indicated by ground symbol with a letter F, which is also connected to the negative side − of the battery 17. The + side of the battery 17 is connected to the vehicle power bus 14 and to the vehicle generator 18, in conventional manner. A storage capacitor 19 is connected between power bus 14 and frame F to supply the surge of current required when all airbags are to be actuated simultaneously by energizing an igniter 21 in each airbag.

Each manually operable switch 12 may have a second pair of contacts c,d which, when the switch 12 is active, are closed to complete a circuit from −battery, via a resistor 22 and a light indicator 23, e.g. a light-emitting diode, to +battery to indicate by illuminating the light indicator that the respective airbag 1 is armed. Each pair of contacts a,b,c,d in switches 12 are coupled to a switch actuator 24, which may be a pushbutton of the push-on-push-off type, as shown in FIG. 4, or an ordinary toggle 15a shown in FIG. 8, detail "a", a turn button or any other suitable type of switch actuator.

Figure 6A:
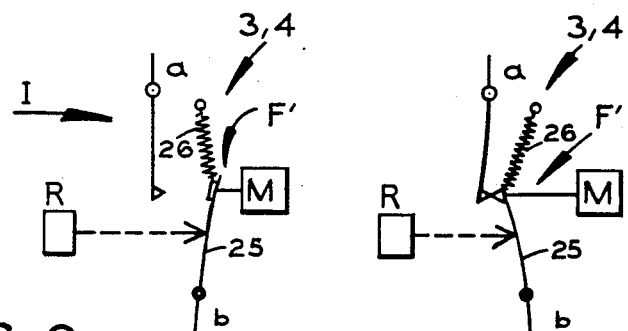
FIG. 6a is a diagrammatic view showing the resettable impact sensor in the reset position.
Figure 6B:
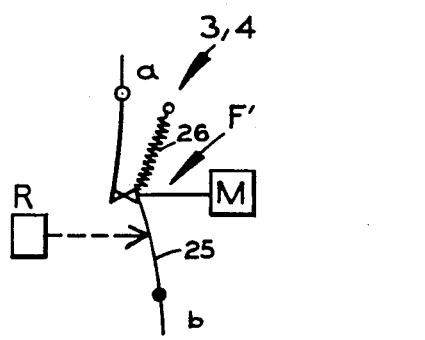
FIG. 6b shows the resettable sensor of FIG. 6a in the set position.

FIG. 6, details a and b, show diagrammatically the components of a resettable impact sensor 3,4, which has a settable pair of contacts including a fixed contact a, and a movable contact 25 which has an over-center spring 26 arranged to hold the movable contact "b" in either the set position as shown in detail "b" or in the reset position shown in detail "a" by means of the push spring 26, applying a force indicated by arrow F' to the tip of contact b. An inertia mass M is coupled to the moving contact b, so that in case of an impact force acting in direction of arrow I, the contact b in the reset position shown in detail "a" is thrown in the set position shown in detail "b". A reset button R connected with contact 25 can be used to manually reset contact 25.

Figure 7A:
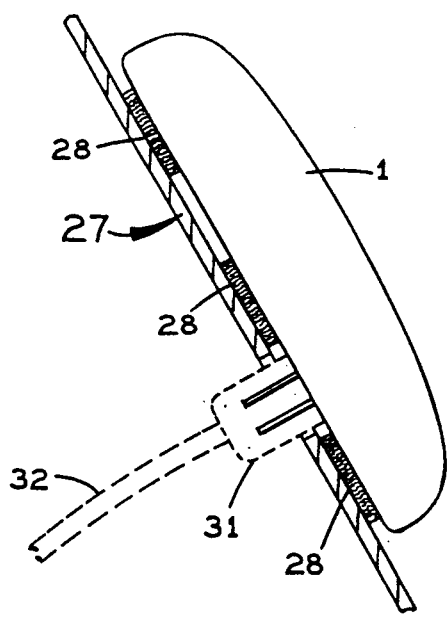
FIG. 7a is an elevational view showing an airbag detachably attached with hook-and-pile fasteners to its support structure.
Figure 7B:
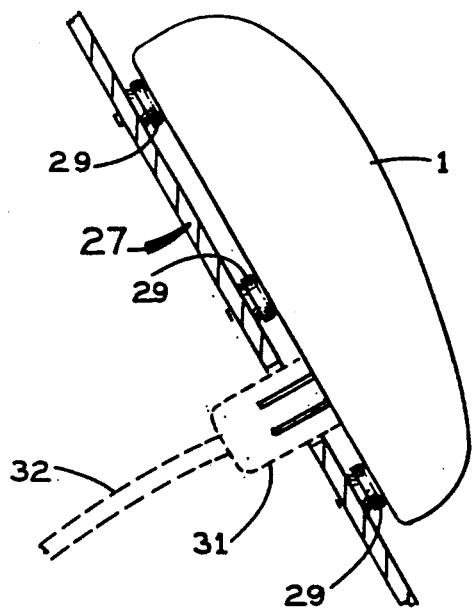
FIG. 7b shows the airbag detachably attached by means of snap fasteners.

FIG. 7, details "a" and "b", shows the physical arrangement of the airbag 1, wherein the airbag is mounted on a support structure, shown generally by a line 27, which is, in the case of the driver's seat, the center part of the steering wheel 2, and in the case of the passenger seats can be a structure firmly attached to the dashboard or the back rests of the seats immediately forward of the rear seats. The airbag 1 proper is conventional in that it includes a folded bag with a gas generator and igniter inside it, as shown in the prior art, but is distinct from the prior art in that it is detachably, i.e. removably, attached to the support structure by means of, for example, hook-and-pile (also known as VELCRO ®) patches 28, or by means of snap fasteners 29, or by means of any other suitable detachable form of fastener. Furthermore, the airbag 1 is electrically connected by a plug-and-jack arrangement 31 via a cable 32 to the selector switch circuit shown in FIG. 5.

We claim:

1. An airbag system for a vehicle having a plurality of seats, comprising a respective support structure fixedly disposed forward of each of said seats; a plurality of inflatable airbags; respective releasable attachment means disposed between each airbag and a respective support structure; at least one impact sensor in said vehicle; selective airbag connection means for selectively connecting at least a selected one of said inflatable airbags with said impact sensor for inflating at least said selected one of said airbags upon an impact of said vehicle; wherein said releasable attachment means include at least one of a plurality of hook-and-pile fasteners disposed between said airbags and said respective support structure, and a plurality of snap fasteners disposed between said airbags and said respective support structure; said releasable attachment means further including an electrical plug and jack connection for said airbag.

2. An airbag system according to claim 1, including a selector switch in said selective airbag connection means, said selector switch having a plurality of manually operable switches and an input terminal connected to said impact sensor, each manually operable switch having a first contact pair, each first contact pair having a contact connected to said input terminal, and an output contact connected to a respective airbag.

3. An airbag system according to claim 2 including a visual indicator coupled to each manually operable switch for indicating the switch being in its set position.

4. An airbag system according to claim 1 including an airbag activating circuit, wherein said impact sensor includes a pair of sensor contacts for closing said airbag activating circuit, said pair of sensor contacts including a fixed contact and a movable contact having a set and a reset position, and an inertia mass in engagement with said movable contact for moving said movable contact into said set position in engagement with said fixed contact on impact.

5. An airbag system according to claim 4 including sensor resetting means, wherein said sensor resetting means include over-center holding means in engagement with said movable contact for holding said movable contact in one of said set and reset positions, and a reset pushbutton in engagement with said movable contact for manually pushing said movable contact into said reset position.

6. An airbag system according to claim 3, wherein each manually operable first contact pair includes a double-throw toggle coupled to said manually operable first contact pair.

7. An airbag system according to claim 2, wherein each of said manually operable contact pair includes a push-on-push-off button coupled to each first manually operable contact pair.

8. An airbag system according to claim 3, including a second contact pair in each manually operable switch connected to said visual indicator for energizing said visual indicator in operated position of said manually operable switch.

9. An airbag system according to claim 8, wherein said visual indicator is a light-emitting diode.

* * * * *